Patented Aug. 8, 1933

1,922,007

UNITED STATES PATENT OFFICE 1,922,007

MASS RESEMBLING IVORY AND METHOD OF MAKING THE SAME

Rudolf Zellmann, Radebeul, Germany, assignor to Chemische Fabrik von Heyden, A. G., Radebeul near Dresden, Germany, a Corporation of Germany No Drawing. Application August 12, 1930, Serial No. 474,883, and in Germany February 8, 1930

3 Claims. (Cl. 106—22)

This invention relates to an artificial mass resembling ivory and it particularly relates to such a mass made from casein.

There have already been suggested a number of methods for the production of artificial masses, such as horn, ivory, and the like masses, from casein.

These processes of the prior art are based on the two properties of freshly precipitated or swollen casein, i. e. first, to be plastic so that it can be shaped into any desired form, and secondly, that these plastic masses, when dry, may be hardened with certain agents, such as formaldehyde. The operation of the processes of the prior art, particularly the step of hardening the plastic masses, required an enormously long time and were therefore rather expensive.

The process, forming the subject matter of the present application, allows to accomplish the making, drying and hardening of this mass in one working day and the hardening agent, which is sulfur, may be had at a very low price so that the advantages of my new invention are remarkable against the high cost of the prior processes.

I have found that if I add an acid to a colloidal solution of sulfur, which contains casein as a protective colloid, a coagel is formed, which, according to the concentration of the applied materials, is either flaky or gritty.

I have furthermore found that such coagels are excellently suitable for the production of plastic masses, which resemble particularly ivory. The colloidal sulfur solution, which contains casein as a protective colloid, may be produced mechanically, for instance by dispersion in a colloid mill, or chemically, by decomposition of poly-sulfide solutions with acids.

The casein may be dissolved in any of the well known ways, for instance with sodium hydroxide solution or that of sodium borate, or the like solvents for casein.

The concentration of sulfur in the coagel may be kept arbitrarily between 20 up to 80 per cents. The higher the sulfur content rises, the harder and more brittle the obtained masses become; but even at a sulfur content of 80% the dry gels may still be worked well so that they can be cut, bored, ground and polished.

In the present process, the colloidal sulfur performs various important functions, of which that of acting as a filler stands in the second line, whereas its function to reduce both the liability of the casein to be chemically affected and its capacity of swelling to a minimum, is the primary essential function. The coagels may be provided, either before or during the forming of plastic masses with all kinds of fillers, dyestuffs or pigments.

For the better understanding of my new invention I cite the following example:

2 parts of casein are dissolved in 12 parts of water to which a small addition of sodium hydroxide was added. To this casein solution I add then a solution of sodium penta-sulfide which contains 3.7 parts of sulfur in 15 parts of water.

The decomposition of the poly-sulfide with 10% hydrochloric acid goes beyond the formation of colloidal sulfur and results ultimately in a flaky coagel of colloidal sulfur in casing. The acid is removed from the coagel by washing it with water; the greater part of the water retained by the casein is removed by pressing it at a relatively low pressure.

The obtained mass is now homogenized, for instance in a salve mill, and becomes thereby so far plastic that it may be transformed under high pressure into plates or other desirable forms. Application of heat greatly facilitates this transformation by pressure. The shaped masses are then finally dried at gentle heat and are hardened by heating them for 10 hours at a temperature of 90 to 95°.

On the ground of experiments I may state that also other albumins, which are coagulated by a suitable agent, are acted upon by sulfur in the way as outlined above.

What I claim is:

1. The method of transforming casein into a horn-like mass resembling ivory, said method comprising dissolving casein in a suitable solvent, adding a solution of a polysulfide to aforesaid casein solution, acting on the solution mixture with an acid thereby generating a coagel of colloidal sulfur in casein, and removing the acid from the coagel.

2. The method of transforming casein into a horn-like mass resembling ivory, said method comprising dissolving casein in sodium hydroxide solution, adding to said solution a solution of sodium polysulfide, acting on the solution mixture with hydrochloric acid thereby producing a coagel of colloidal sulfur in casein, washing the acid out of the coagel, and homogenizing the same into a plastic mass.

3. The method of transforming casein into a horn-like mass resembling ivory, said method consisting in dissolving casein in sodium hydroxide solution, adding to said solution a solution of sodium polysulfide, acting on the solution mixture with hydrochloric acid thereby producing a coagel of colloidal sulfur in casein, washing the acid out of the coagel, homogenizing the same into a plastic mass, and hardening the same by heat of approximately 100° C.

RUDOLF ZELLMANN.